US012628119B2

(12) United States Patent
Kim et al.

(10) Patent No.: US 12,628,119 B2
(45) Date of Patent: May 12, 2026

(54) RADIO FREQUENCY MAP AGGREGATION

(71) Applicant: QUALCOMM Incorporated, San Diego, CA (US)

(72) Inventors: In-Soo Kim, San Diego, CA (US); Peerapol Tinnakornsrisuphap, San Diego, CA (US); Simone Merlin, San Diego, CA (US); Hussein Metwaly Saad, San Diego, CA (US); Yann Lebrun, Velizy-Villacoublay (FR); Mickael Mondet, Louannec (FR)

(73) Assignee: QUALCOMM Incorporated, San Diego, CA (US)

( * ) Notice: Subject to any disclaimer, the term of this patent is extended or adjusted under 35 U.S.C. 154(b) by 300 days.

(21) Appl. No.: 18/455,970

(22) Filed: Aug. 25, 2023

(65) Prior Publication Data

US 2025/0071727 A1 Feb. 27, 2025

(51) Int. Cl.
*H04W 64/00* (2009.01)
*H04W 72/21* (2023.01)
*H04W 72/51* (2023.01)

(52) U.S. Cl.
CPC ......... *H04W 64/006* (2013.01); *H04W 72/21* (2023.01); *H04W 72/51* (2023.01)

(58) Field of Classification Search
CPC ..... H04W 64/006; H04W 8/24; H04W 24/02; H04W 24/10; H04W 72/21; H04W 72/51
See application file for complete search history.

(56) References Cited

U.S. PATENT DOCUMENTS

| | | | |
|---|---|---|---|
| 2014/0315570 A1* | 10/2014 | Yun | G01S 5/0264 455/456.1 |
| 2024/0089904 A1* | 3/2024 | Balasubramanian | G01S 5/16 |
| 2025/0069255 A1* | 2/2025 | Peng | G01C 21/3811 |
| 2025/0181296 A1* | 6/2025 | Jung | H04N 21/485 |
| 2025/0231806 A1* | 7/2025 | Carr | G02B 27/017 |

* cited by examiner

*Primary Examiner* — Siu M Lee

(74) *Attorney, Agent, or Firm* — Harrity & Harrity, LLP

(57) ABSTRACT

Various aspects of the present disclosure generally relate to wireless communication. In some aspects, a user equipment (UE) may transmit position information regarding a position of the UE and camera information captured by the UE. The UE may receive a radio frequency (RF) map, wherein the RF map is associated with the position information. The UE may transmit information indicating an update to the RF map. Numerous other aspects are described.

28 Claims, 11 Drawing Sheets

810 Transmit position information regarding a position of the UE and camera information captured by the UE 820 Receive a radio frequency (RF) map, wherein the RF map is associated with the position information 830 Transmit information indicating an update to the RF map

800

Receive position information regarding a position of a user equipment (UE) and camera information captured by the UE Transmit a radio frequency (RF) map, wherein the RF map is associated with the position information

910

920

900

1000

1008

Reception Component 1002

Communication Manager 1006

Transmission Component 1004

RADIO FREQUENCY MAP AGGREGATION

FIELD OF THE DISCLOSURE

Aspects of the present disclosure generally relate to wireless communication and to techniques and apparatuses for radio frequency map aggregation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes transmitting position information regarding a position of the UE and camera information captured by the UE; receiving a radio frequency (RF) map, wherein the RF map is associated with the position information; and transmitting information indicating an update to the RF map.

In some aspects, a method of wireless communication performed by a network node includes receiving position information regarding a position of a UE and camera information captured by the UE; and transmitting a RF map, wherein the RF map is associated with the position information.

In some aspects, an apparatus for wireless communication at a UE includes one or more memories; and one or more processors, coupled to the one or more memories, individually or collectively configured to cause the UE to: transmit position information regarding a position of the UE and camera information captured by the UE; receive a RF map, wherein the RF map is associated with the position information; and transmit information indicating an update to the RF map.

In some aspects, an apparatus for wireless communication at a network node includes one or more memories; and one or more processors, coupled to the one or more memories, individually or collectively configured to cause the network node to: receive position information regarding a position of a UE and camera information captured by the UE; and transmit a RF map, wherein the RF map is associated with the position information.

In some aspects, a non-transitory computer-readable medium storing a set of instructions for wireless communication includes one or more instructions that, when executed by one or more processors of a UE, cause the UE to: transmit position information regarding a position of the UE and camera information captured by the UE; receive a RF map, wherein the RF map is associated with the position information; and transmit information indicating an update to the RF map.

In some aspects, a non-transitory computer-readable medium storing a set of instructions for wireless communication includes one or more instructions that, when executed by one or more processors of a network node, cause the network node to: receive position information regarding a position of a UE and camera information captured by the UE; and transmit a RF map, wherein the RF map is associated with the position information.

In some aspects, an apparatus for wireless communication includes means for transmitting position information regarding a position of the UE and camera information captured by the UE; means for receiving a RF map, wherein the RF map is associated with the position information; and means for transmitting information indicating an update to the RF map.

In some aspects, an apparatus for wireless communication includes means for receiving position information regarding a position of a UE and camera information captured by the UE; and means for transmitting a RF map, wherein the RF map is associated with the position information.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
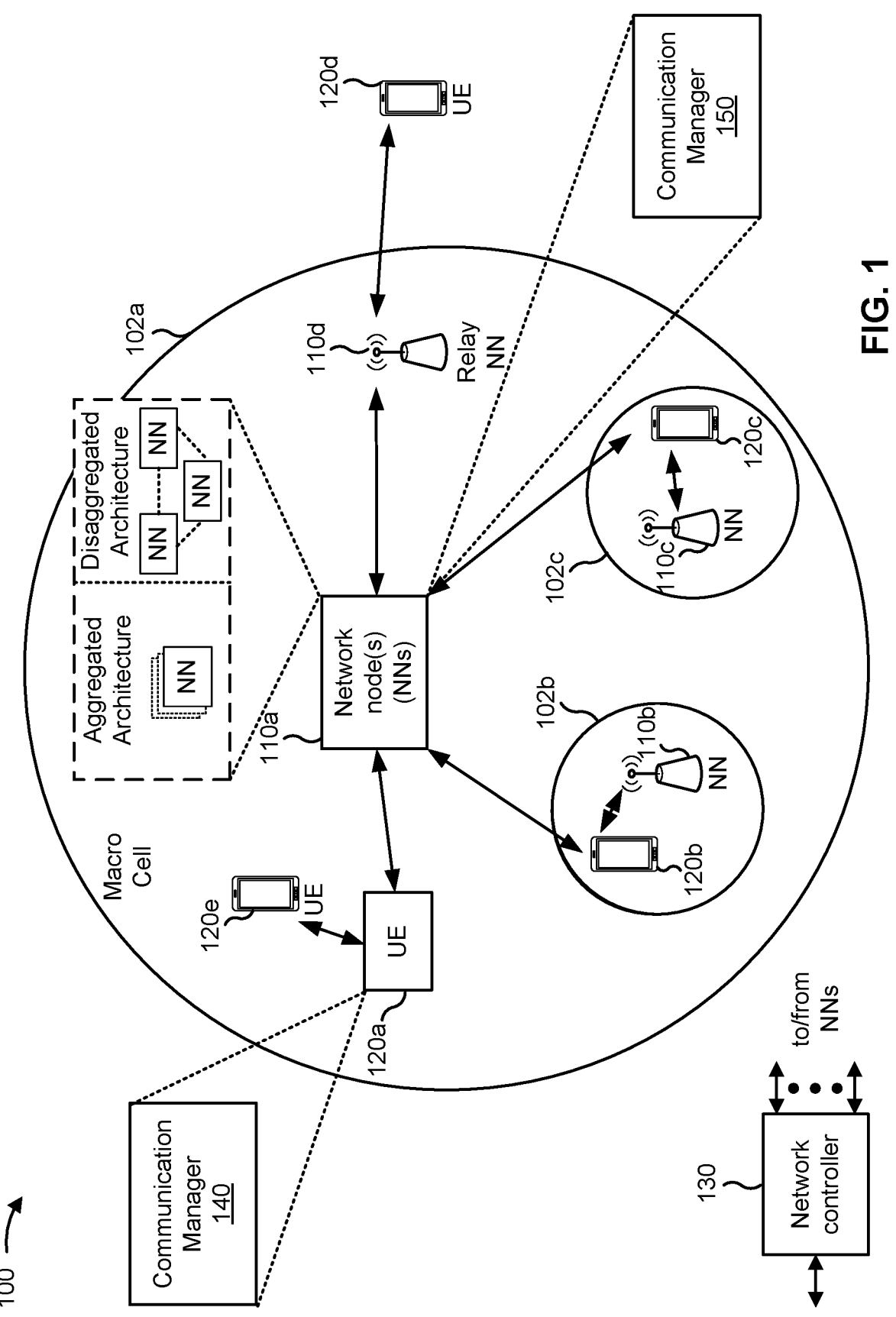
FIG. 1 is a diagram illustrating an example of a wireless network, in accordance with the present disclosure.

A user equipment (UE), or a device associated with a UE such as a peripheral device or an extended reality (XR) device, may include various sensors, such as an inertial measurement unit (IMU) and a camera. These sensors may enable a UE to become aware of or gather information regarding an environment of the UE. This information may include, for example, a location of a signal source (e.g., a gNB, a repeater, a reflector), a strength of a signal source, a blockage, or a two-dimensional or three-dimensional reconstruction of the environment. This information gathering or awareness may be referred to as perception. Perception, in conjunction with radio frequency (RF) measurement, may help with meeting parameters for challenging applications in dynamic environments such as XR and cloud gaming.

Combining perception and RF measurement may provide information that can assist in operations such as beam management (e.g., tracking strong signal sources as the UE reorients in space), handover (e.g., triggering early handover in anticipation of an incoming blockage or skipping handover in anticipation of a decrease in reference signal received power (RSRP) being temporary), and roaming (e.g., switching between different radio access technologies based on an RF map according to perception information associated with the RF map). For example, an RF map, which may include information regarding spatial parameters (location, direction, beamwidth) of RF signals and strength of the RF signals, may be beneficial for a UE to perform such operations. However, a UE that is new to a given environment may take some amount of time to compile a usable RF map for the given environment. This may result in the UE operating in the given environment for a time without an RF map, which may inhibit the UE from taking action to improve a wireless connection and/or to try to minimize the occurrence of issues with the wireless connection.

Aspects of the present disclosure relate generally to communication of an RF map. Some aspects more specifically relate to transmission, reception, and updating of an RF map by a plurality of UEs. In some aspects, a UE may transmit position information regarding a position of the UE. The UE may also transmit camera information (e.g., an image, a video) captured by the UE. The UE may receive an RF map associated with the position information. For example, the RF map may be associated with the position information in that the RF map is for a spatial location of the UE indicated by the position information. In some aspects, the UE may transmit information indicating an update to the RF map. For example, the UE may update the RF map according to RF measurements and/or position information (e.g., a spatial location and/or an orientation of the UE). In some aspects, the RF map may use a coordinate system of the position information. For example, the network node may apply a transformation to a baseline RF map to generate the RF map as transmitted to the UE. In some aspects, the transformation may be based at least in part on at least one of the position information or the camera information. For example, the network node may use the camera information to identify a position and/or orientation of the UE in the baseline RF map's coordinate system, and then may apply a transformation based on a difference between the baseline RF map's coordinate system and the position information's coordinate system.

Aspects of the present disclosure can be used to realize one or more of the following potential advantages. In some aspects, by receiving an RF map associated with position information regarding a position of the UE, the UE can take advantage of the information in the RF map more quickly than if the UE has to generate entire the RF map itself, which reduces latency associated with certain operations (e.g., beam management, handover, roaming) and improves efficiency of communication of the UE. In some aspects, by transmitting the information indicating the update to the RF map, the UE enables generation of an RF map (e.g., a global RF map, referred to herein as a baseline RF map) based on inputs of multiple UEs, which may be more efficient and thorough than relying on a single UE, or measurements of a network operator, to generate such a map. In some aspects, by transforming the baseline RF map to generate the RF map in the coordinate system of the UE, the network node facilitates usage of the RF map at the UE while conserving processing resources of the UE that would otherwise be used to identify and apply the transformation. Furthermore, using the camera information to transform the baseline RF map may reduce RF overhead relative to a technique that uses RF information to identify a reference point, and may be more reliable than other techniques for identifying a reference point of the UE relative to the coordinate system of the baseline RF map. Still further, transforming the baseline RF map enables reception and provision of RF maps associated with multiple UEs in different orientations, thereby improving cooperative perception-aided communications.

Thus, the network may jointly leverage the sensing information from multiple UEs by aggregating their RF maps, and may thereby provide gains of proposed cooperative perception-aided communications with RF map aggregation. In this way, the network can build and share a global (e.g., baseline) RF map that can offer various gains, such as UE adaptation to unseen environments by loading the RF maps of those environments, improving the serving beam RSRP by merging the RF maps instead of relying on an RF map built by one UE alone, sharing knowledge about a blockage detected at one UE to prepare another UE for handover, improving the link capacity estimation (LCE) of the UEs by sharing the updates to the RF map, and increasing a UE's grant reception before the UE moves from a line-of-sight (LoS) to a non-line-of-sight (NLoS) area. The techniques described herein (e.g., RF map crowdsourcing) may provide improved beam management performance at a UE that is provided an RF map generated by aggregating information from other UEs. For example, the UE may experience an RSRP gain on a serving beam of the UE of approximately 2-5 dBm.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120c), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*c*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit position information regarding a position of the UE and camera information captured by the UE; receive a RF map, wherein the RF map is associated with the position information; and transmit information indicating an update to the RF map. Additionally, or alternatively, the communication manager 140 may perform one or more other operations described herein.

In some aspects, the network node 110 may include a communication manager 150. As described in more detail elsewhere herein, the communication manager 150 may receive position information regarding a position of a UE and camera information captured by the UE; and transmit a RF map, wherein the RF map is associated with the position information. Additionally, or alternatively, the communication manager 150 may perform one or more other operations described herein.

As indicated above, FIG. 1 is provided as an example. Other examples may differ from what is described with regard to FIG. 1.

Figure 2:
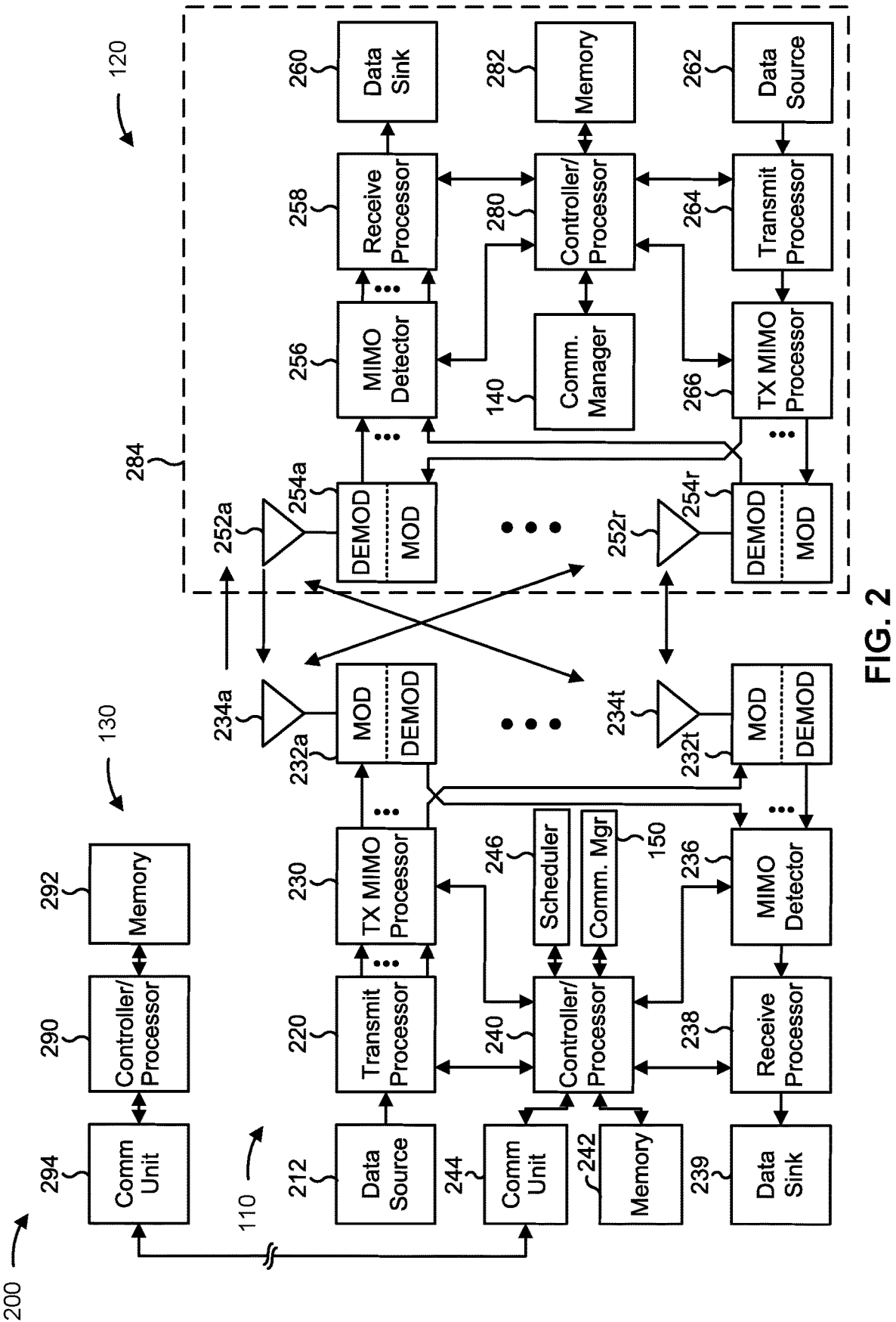
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and May provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine an RSRP parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-11).

The controller/processor 240 of the network node 110, the controller/processor 280 of the UE 120, and/or any other component(s) of FIG. 2 may perform one or more techniques associated with RF map aggregation, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compil-

US 12,628,119 B2

Figure 8:
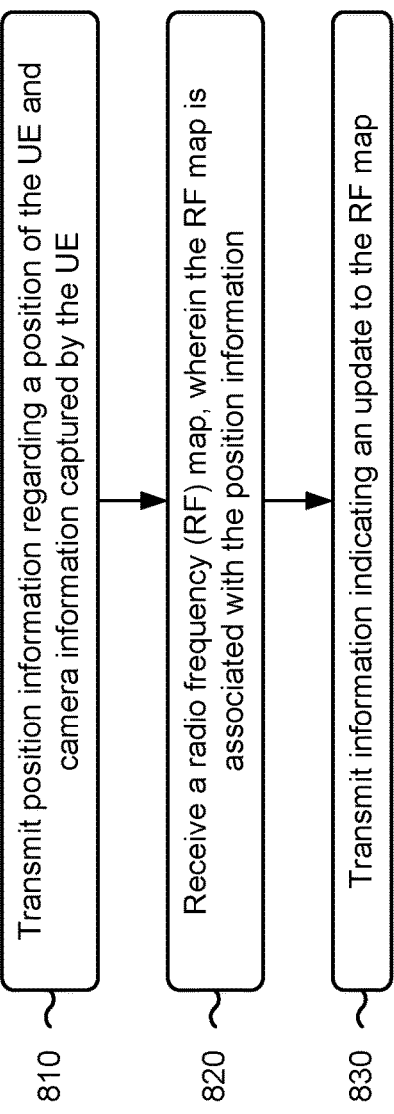
FIG. 8 is a diagram illustrating an example process performed, for example, at a UE or an apparatus of a UE, in accordance with the present disclosure.
Figure 9:
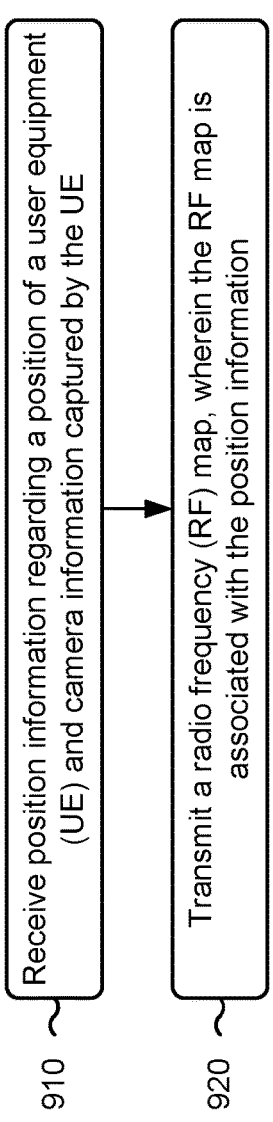
FIG. 9 is a diagram illustrating an example process performed, for example, at a network node or an apparatus of a network node, in accordance with the present disclosure.

13 ing, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for transmitting position information regarding a position of the UE and camera information captured by the UE; means for receiving a RF map, wherein the RF map is associated with the position information; and/or means for transmitting information indicating an update to the RF map. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for receiving position information regarding a position of a UE and camera information captured by the UE; and/or means for transmitting a RF map, wherein the RF map is associated with the position information. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
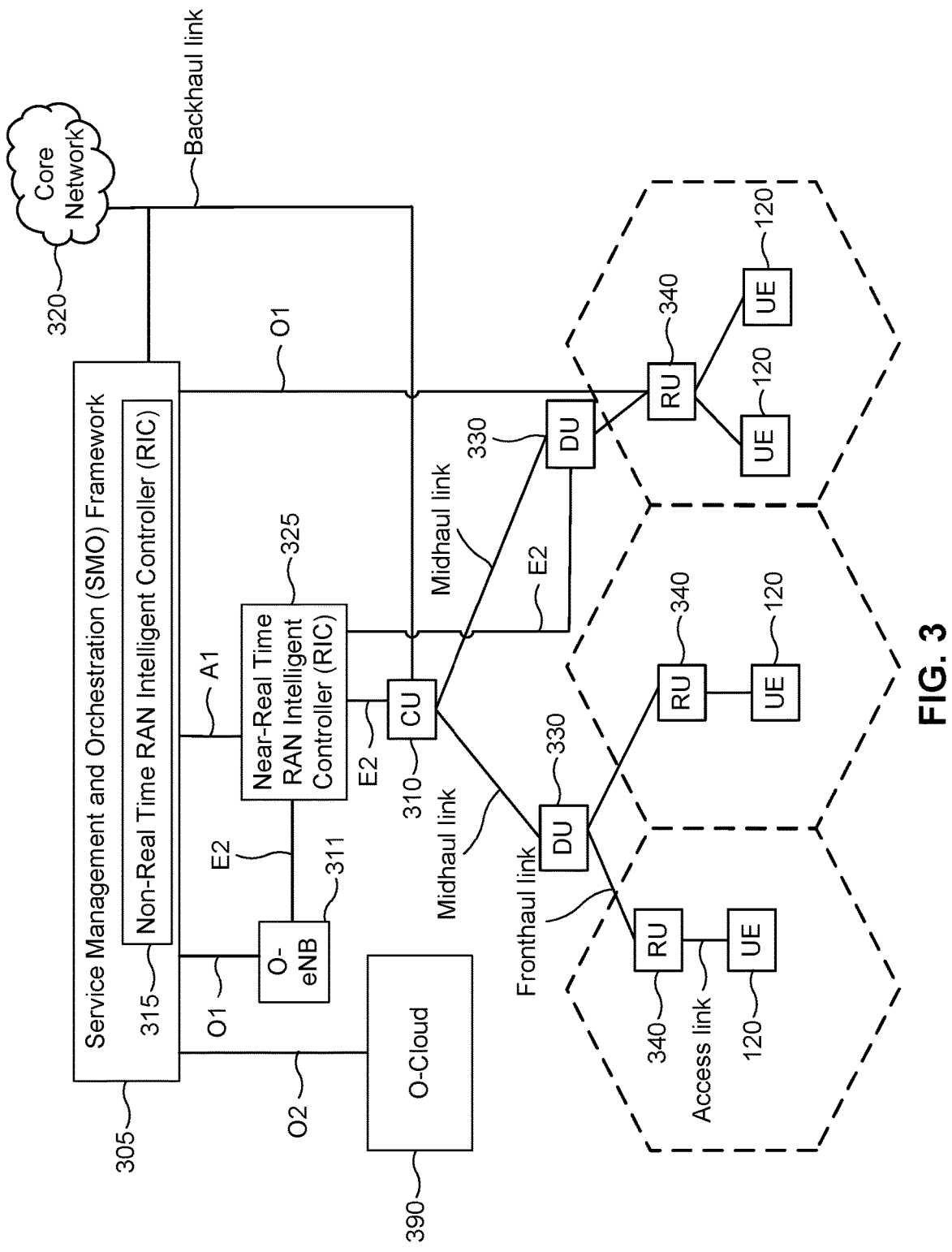
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective RF access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the El interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-CNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
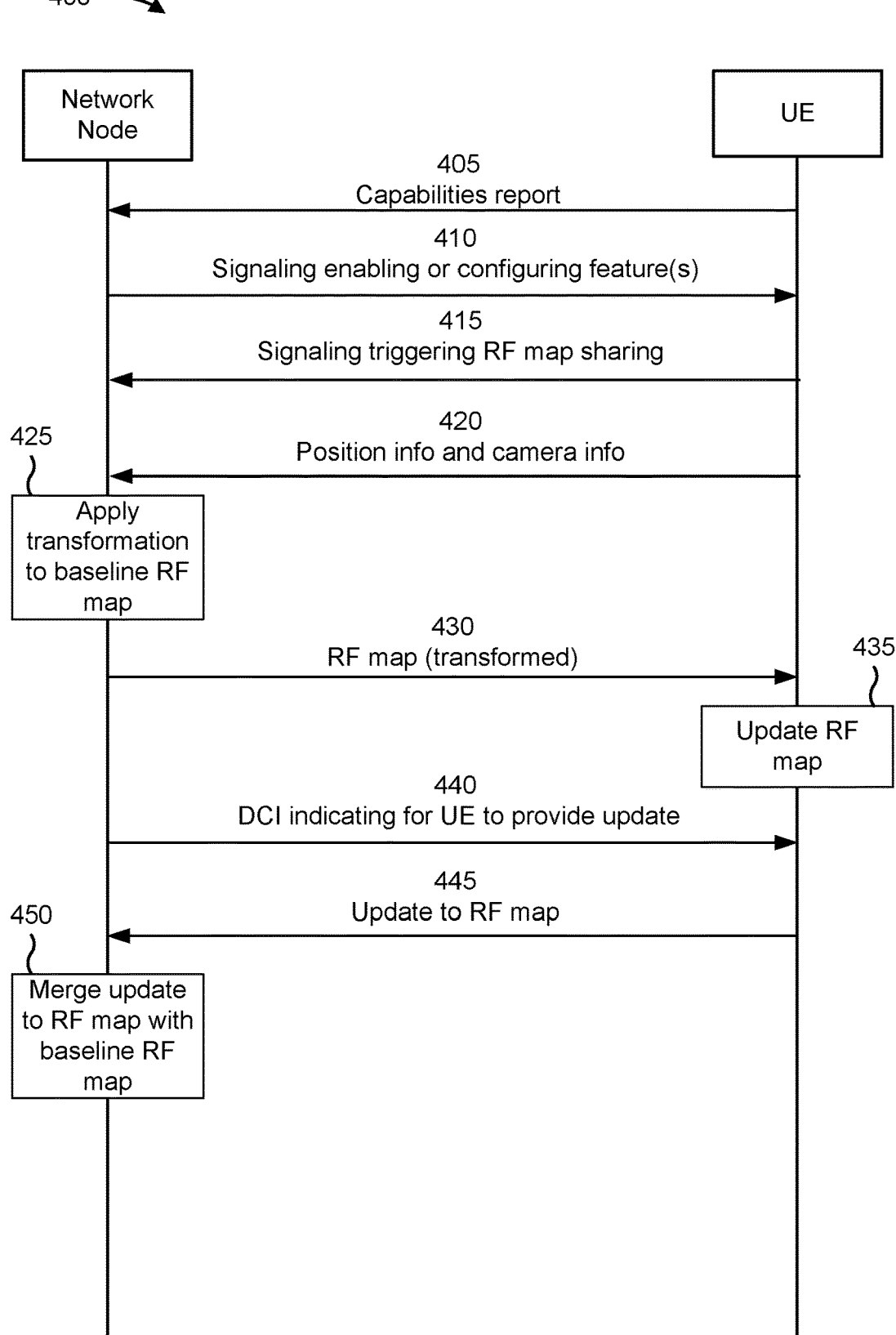
FIG. 4 is a diagram illustrating an example of signaling associated with radio frequency (RF) map sharing, in accordance with the present disclosure.

FIG. 4 is a diagram illustrating an example 400 of signaling associated with RF map sharing, in accordance with the present disclosure. Example 400 includes a UE (e.g., UE 120) and a network node (e.g., network node 110, a CU, a DU, and/or an RU). As shown, the network node may be associated with a cloud environment. For example, the network node may provide access to the cloud environment for UEs. As another example, the network node (e.g., a gNB) may be included in the cloud environment. As another example, the network node may communicate with a service or application of the cloud environment. Operations described as performed by the network node (e.g., transforming a coordinate system, identifying a transformation based on camera information, aggregating UE updates to a baseline RF map) may be performed by the network node or by an entity of the cloud environment, such as a service or application.

As shown by reference number 405, the UE may transmit, and the network node may receive, a capabilities report including capability information. The capabilities report may indicate whether the UE supports a feature and/or one or more parameters related to the feature. In some aspects, the capability information may indicate a capability and/or parameter for a sensor associated with the position information. For example, the capability information may indicate a type of perception capability supported by the UE (e.g., an IMU, a camera, a depth map). In some aspects, the capabilities report may indicate a calibration parameter and/or an associated capability relating to the position information or the camera information. For example, the capability information may indicate one or more UE-specific sensor calibration parameters that describe how the coordinate systems of one or more sensors (e.g., an IMU, a first camera such as a left camera, a second camera such as a right camera, etc.) are aligned and/or calibrated, which may help the network node to coherently merge RF maps across different UEs with various types of sensors and capabilities. In some aspects, the capability information may indicate a an RF parameter and/or an associated capability relating to the RF map. For example, the capability information may indicate one or more UE-specific RF calibration parameters that describe a configuration of a UE beam codebook, an antenna gain of one or more antennas of the UE, etc. The RF parameter may be used by the network node to coherently merge the RF maps across different UEs. One or more operations described herein may be based on capability information of the capabilities report. For example, the UE may perform a communication in accordance with the capability information, or may receive configuration information that is in accordance with the capability information.

As shown by reference number 410, the network node may transmit, and the UE may receive, signaling that enables or configures one or more features. In some aspects, the UE may receive the signaling via one or more of system information (e.g., a master information block (MIB) and/or a system information block (SIB), among other examples), RRC signaling, one or more medium access control (MAC) control elements (CEs), and/or downlink control information (DCI), among other examples.

In some aspects, the signaling may enable reception of the RF map. For example, the signaling may indicate whether the UE is allowed to receive (e.g., share) the RF map from the network node. This may be based at least in part on the capability information of reference number 405 (e.g., the network node may configure the UE to receive the RF map if the UE indicates a capability for processing the RF map). In some aspects, the signaling may configure the UE to transmit an indication of a use case for the RF map, such that the UE can request an RF map associated with an appropriate use case. The use case may include, for example, beam management, handover, link capacity estimation, or roaming. In some aspects, the signaling may enable transmission of the position information and/or the camera information. In some aspects, the signaling may configure the UE to update a received RF map, such as based at least in part on measurements collected by one or more sensors of the UE. In some aspects, the signaling may configure the UE to override a decision (e.g., by a legacy modem) based at least in part on the RF map (e.g., based at least in part on the UE's sensors and the RF map). For example, the signaling may configure or enable the UE to modify a handover criterion to take into account information from an IMU (e.g., position information) to trigger a proactive handover instead of waiting for an RSRP to fall below a threshold. In some aspects, the overridden decision may be based at least in part on a use case of the RF map. For example, the overridden decision may relate to beam management for a beam management RF map, to handover for a handover RF map, to roaming for a roaming RF map, or to LCE for an LCE RF map.

In some aspects, the configuration information may indicate one or more candidate configurations and/or communication parameters. In some aspects, the one or more candidate configurations and/or communication parameters may be selected, activated, and/or deactivated by a subsequent indication. For example, the subsequent indication may select a candidate configuration and/or communication parameter from the one or more candidate configurations and/or communication parameters. In some aspects, the subsequent indication (e.g., an indication described herein) may include a dynamic indication, such as one or more MAC CEs and/or one or more DCI messages, among other examples.

As shown by reference number 415, the UE may transmit, and the network node may receive, signaling such as uplink control information (UCI). In some aspects, the signaling may trigger RF map sharing. For example, the UCI may trigger the network node to provide an RF map to the UE. In some aspects, the UCI may include the position information and/or the camera information. In some aspects, the UE may transmit the position information and/or the camera information via another form of uplink signaling, such as a physical uplink shared channel (PUSCH) transmission. In some aspects, the signaling shown by reference number 415, or other signaling, may indicate a use case (e.g., may indicate what kind of RF map the UE is to receive). For example, the signaling shown by reference number 415 or the other signaling may indicate a beam management use case, a handover use case, an LCE use case, a roaming use case, or the like.

As shown by reference number 420, the UE may transmit, and the network node may receive, position information and/or camera information. For example, the position information may include information indicating a six-degrees-of-freedom definition of a position of the UE in a coordinate system relative to a reference point known to the UE (denoted as $6DoF_{UE}$). The position of the UE may include, for example, a spatial position of the UE (e.g., in an X-Y-Z coordinate system) and an orientation (e.g., pose) of the UE (e.g., in a pitch-yaw-roll system). The camera information may include one or more camera frames, a video, Lidar information, or the like. In some aspects, the camera information may be associated with the position information. For example, the camera information may be captured at the position indicated by the position information. Additionally, or alternatively, the camera information may be captured within a threshold length of time of the position information being captured.

In some aspects, the UE may transmit the position information and/or the camera information via application-layer signaling. For example, the UE and the network node may be associated with an application (e.g., a dedicated perception-aided beam management application) through which the UE and the network node (e.g., an entity of a cloud environment) may exchange the position information, the camera information, an RF map, and/or an update to an RF map in the application layer. In some aspects, the UE may transmit the position information and/or the camera information via a quality of service (QOS) flow (e.g., in association with a QoS flow identifier), a data radio bearer (DRB), a logical channel, or a combination thereof. Thus, the UE may transmit this information using a 5G system or a future generational cellular technology's framework.

The UE may determine the position information using one or more sensors. Sensors may be on, in, or co-located with a second device that is a UE and may include, for example, an IMU sensor, a camera, or sensors for 6 DoF, such as in a head-mounted display (HMD). Sensors may be on, in, or co-located with a second device that is a base station (e.g., gNB), including cameras near base station antennas. The sensors may be located separate from the first device and may include a surveillance camera or a radar. The sensors may be part of an NR service-based architecture, may produce NR services, may provide service advertisements, and/or may be part of service discovery via a network repository function (NRF) for core network functions. The sensors may be part of a native UE/RAN protocol and may use RRC) signaling to provide a perception capability and to provide perception information (e.g., via measurement configuration and/or reports).

As shown by reference number 425, the network node may apply a transformation to a baseline RF map. A baseline RF map may include an RF map. An RF map may include location and impact information about blocking objects, beam conditions, beam blockage, and/or beam reflection in the environment. In some aspects, an RF map may indicate signal strength, throughput, beam directions, or the like. This information may be associated with locations. For example, an RF map may indicate, for a given location, a blocking object, beam condition, beam blockage, beam reflection, signal strength, throughput, or beam direction. A baseline RF map may be stored at the network node or at an application separate from the network node. A baseline RF map may use a coordinate system, such as a three-dimensional coordinate system or a 6 DoF coordinate system. A baseline RF map may be referred to as a global RF map. In some aspects, the network node may compile the baseline RF map based at least in part on information from multiple UEs, as described elsewhere herein. In some aspects, a baseline RF map may include a prior version of an RF map (e.g., an RF map that is at least a threshold number of minutes, hours, or days old), an RF map generated by a network technician (e.g., using an RF spectrum analyzer or reader), or the like. The transformation of the baseline RF map is described in more detail elsewhere herein.

In some aspects, an RF map may identify one or more anchors. An anchor may be identified by an index. An anchor may indicate location information (such as a three-dimensional coordinate relative to a reference point) and an RF parameter corresponding to the location information (such as a received power in dBm). Updating an RF map may include adding an anchor, modifying a value (e.g., an RF parameter) of an anchor, or deleting an anchor. In some aspects, updating the baseline RF map may include adding, modifying, or deleting multiple anchors according to updates received from one or more UEs.

As shown by reference number 430, the network node may transmit, and the UE may receive, an RF map. The RF map as transmitted to the UE may be transformed relative to the baseline RF map. Thus, the RF map as transmitted to the UE may be referred to as a local RF map. Details regarding signaling of the RF map (e.g., the local RF map) are described with regard to reference number 420, above. The RF map may include a portion of the baseline RF map that is relevant to the UE. For example, the network node may determine which part of the baseline RF map is relevant to the UE, and may provide the part of the baseline RF map that is relevant to the UE (e.g., an RF map of a first floor, an RF map of a particular building, etc. based on a location of the UE, a direction of movement of the UE, a user account associated with the UE, or the like).

As shown by reference number 435, the UE may update the RF map. For example, the UE may update the RF map based at least in part on an RF measurement. This is described in more detail elsewhere herein.

As shown by reference number 440, in some aspects, the network node may transmit, and the UE may receive, signaling (e.g., DCI) indicating for the UE to provide an update to the RF map. Providing an update to the RF map may include providing an updated RF map that incorporates the update. An update to the RF map may include an updated RF measurement, an indication that a prior RF measurement may not be accurate, an indication of a presence and/or location of a possible new blockage in an RF signal, or the like. In some aspects, the signaling shown by reference number 440 may indicate for the UE to upload the RF map to the cloud for RF map merge.

As shown by reference number 445, the UE may transmit, and the network node may receive, an update to the RF map. For example, the UE may transmit the update to the RF map in association with (e.g., in response to) the signaling shown by reference number 440. In some aspects, the UE may transmit, in association with the update to the RF map, position information of the UE (e.g., a $6\text{DoF}_{UE}$ parameter) and/or camera information. Thus, the network node can identify a coordinate system used for the update to the RF map, as described elsewhere herein. For example, the UE may track a change to the UE's coordinate system, such as relative to a UE-specific reference point or the coordinate system used for the local RF map. The UE may provide an indication of this change, or may provide an RF map using an updated coordinate system. In some aspects, the UE may transmit the update in accordance with signaling enabling transmission of the information indicating the update to the RF map.

In some aspects, the UE may perform an operation based at least in part on the updated RF map. For example, the UE may identify an updated beam direction according to an RF map. As another example, the UE may trigger an early handover or delay a handover according to an RF map. As another example, the UE may select a RAT (e.g., 5G, WiFi, 6G, etc.) according to an RF map.

As shown by reference number 450, the network node may merge the update to the RF map with the baseline (e.g., global) RF map. For example, the network node may collect updates to the baseline RF map from multiple UEs including the UE. The network node may merge these updates into the baseline RF map so that the baseline RF map reflects the most recently received information from the UEs, information that has been confirmed by one or more UEs, or the like. Thus, techniques described herein enable a method that enables RF map aggregation, which may include merging the local RF maps of the UEs into a global RF map at the network node (e.g., the cloud) and sharing the global RF map with the UEs upon the UE's request, along with a mechanism that aligns the coordinate systems of the UEs to build the global RF map. The network node may align the coordinate system of the baseline (e.g., global) RF map and coordinate systems of the UEs via a visual positioning system (VPS) that aligns reference points of the UEs by comparing the camera information sent from the UEs with a visual map (VI-map) at the network node (e.g., the cloud). Thus, RF map aggregation across UEs that do not share a common reference point is enabled.

As indicated above, FIG. 4 is provided as an example. Other examples may differ from what is described with respect to FIG. 4.

Figure 5:
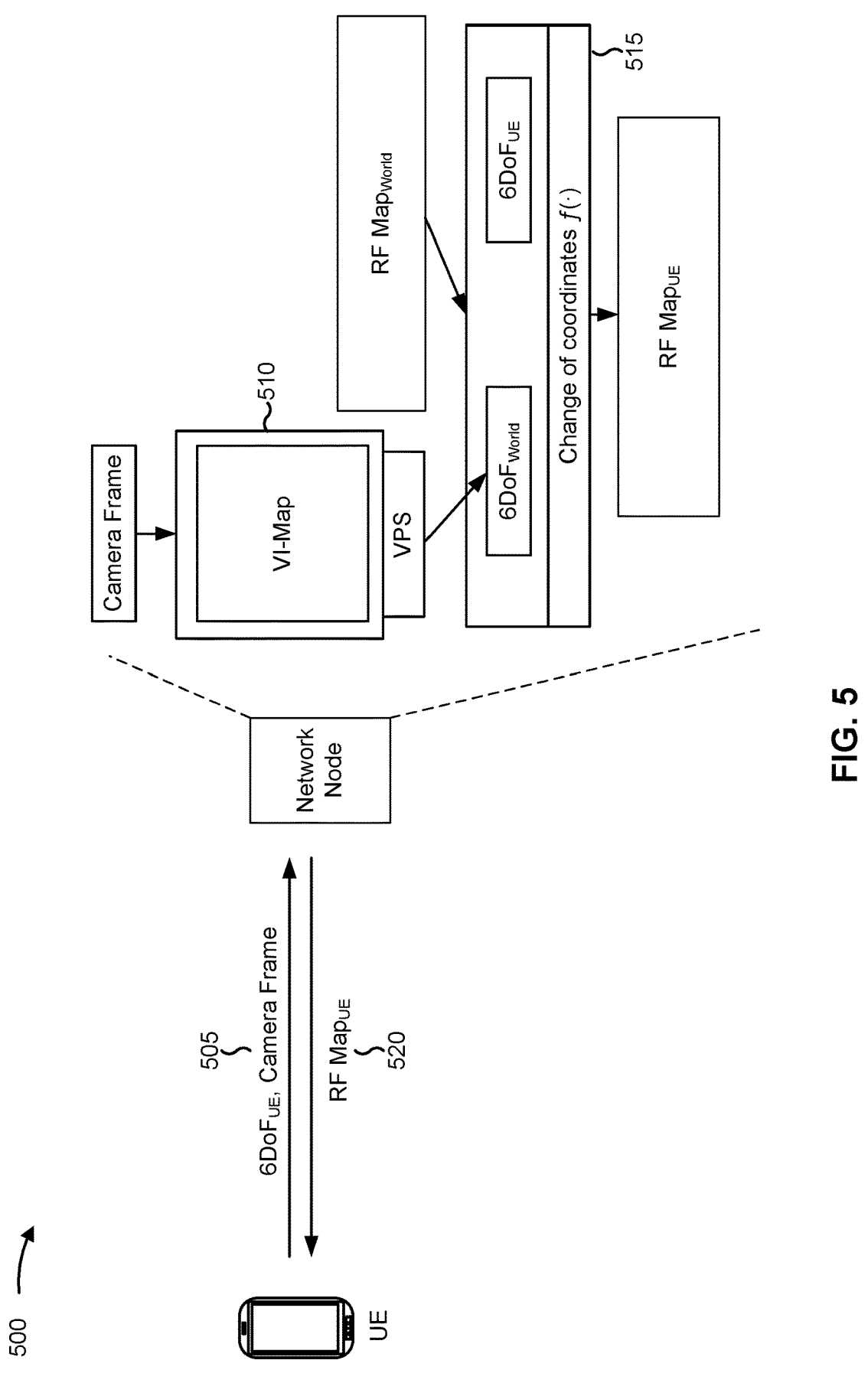
FIG. 5 is a diagram illustrating an example of transformation and provision of an RF map to a UE, in accordance with the present disclosure.

FIG. 5 is a diagram illustrating an example of transformation and provision of an RF map to a UE, in accordance with the present disclosure. The operations of example 500 may be performed by a UE (e.g., UE 120, the UE of FIG. 4) or a network node (e.g., network node 110, the network node of FIG. 5). FIG. 5 illustrates examples of providing position information and camera information (as at reference number 420 of FIG. 4), applying a transformation to a baseline RF map (as at reference number 425 of FIG. 4), and transmission of the RF map to the UE (as at reference number 430 of FIG. 4).

As shown by reference number 505, the UE may transmit, and the network node may receive, position information (shown as $6DoF_{UE}$) and camera information (shown as "Camera Frame"). For example, the UE may initiate a request for access to a baseline (e.g., global) RF map by sending the position and pose of the UE relative to a UE-specific reference point along with a corresponding camera frame to the network node (e.g., cloud).

As shown by reference number 510, the network node (e.g., cloud, a VPS of the network node) may compare the camera information (e.g., the camera frame) with a visual map (VI-map). The VI-map may include a database of camera information (e.g., camera frames) that capture an environment (e.g., building) indicated by the location information. By comparing the camera information with the VI-map, the network node may determine a position and/or pose (e.g., position information such as a 6 DoF parameter) of the UE in a coordinate system of the baseline RF map (referred to as $6DoF_{World}$). In some aspects, the network node (e.g., VPS) may determine a relevant portion of the baseline RF map based at least in part on the camera information. For example, the cloud may determine which part of the baseline (e.g., global) RF map, such as which building, the UE is located at.

As shown by reference number 515, the network node (e.g., cloud, a change-of-coordinates module of the network node) may identify a transformation f(·) that aligns $6DoF_{UE}$ and $6DoF_{World}$. The network node may apply a transformation f(·) to the coordinate system of the baseline RF map (e.g., the network node may apply a change of coordinates to the world-coordinate-system-aligned global RF map stored at the network node using f(·)). Thus, the network node may generate the RF map for transmission to the UE.

In some aspects, the network node may identify the position and/or pose of the UE in the coordinate system of the baseline RF map ($6DoF_{World}$) using the camera information, as described above. For example, the network node may identify one or more reference points, in the camera information, that are associated with a known position and/or pose. As another example, the network node may triangulate a position and/or pose of the UE by reference to multiple reference points in the camera information. The network node may identify the one or more reference points by reference to a map including a collection of images of an environment. For example, the map may include a visual depiction of the entire environment. To identify the one or more reference points, the network node may compare one or more images of the camera information to the collection of images of the environment, and may identify a match between the one or more images and an image of the collection of images. The network node may then identify $6DoF_{World}$ according to the map and using the matching image (e.g., a position and/or pose corresponding to the matching image). The UE may identify the transformation based at least in part on $6DoF_{World}$ and $6DoF_{UE}$. For example, the UE may identify the transformation f(·) as ($6DoF_{World}$ minus $6DoF_{UE}$) or ($6DoF_{UE}$ minus $6DoF_{World}$). The UE may apply the transformation f(·) to the coordinate system of the baseline RF map such that a coordinate system of the baseline RF map is converted to be aligned with the coordinate system of the UE.

As shown by reference number 520, the network node (e.g., the cloud) may transmit the UE-coordinate-system-aligned baseline (e.g., global) RF map, stored at the cloud, to the UE. As noted, in some aspects, the network node may provide a portion of the RF map that is relevant to the UE.

As indicated above, FIG. 5 is provided as an example. Other examples may differ from what is described with regard to FIG. 5.

Figure 6:
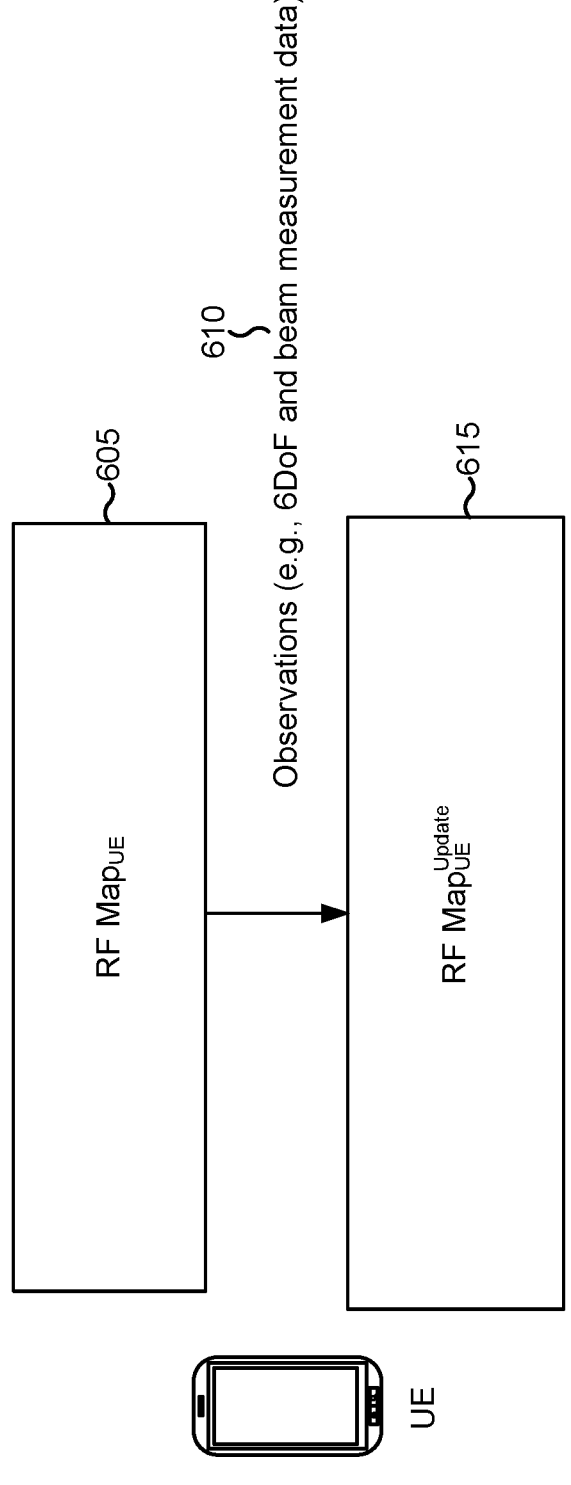
FIG. 6 is a diagram illustrating an example of updating an RF map, in accordance with the present disclosure.

FIG. 6 is a diagram illustrating an example 600 of updating an RF map, in accordance with the present disclosure. The operations of example 600 may be performed by a UE (e.g., UE 120, the UE of FIGS. 4 and 5). Example 600 illustrates updating an RF map at the UE, as described with regard to reference number 435 of FIG. 4.

As shown in FIG. 6, and by reference number 605, the UE may be associated with an RF map, denoted as RF MapCE. This RF map may be received from a network node (e.g., network node 110, the network node of FIGS. 4-5). As shown by reference number 610, the UE may identify an update to the RF map. For example, the UE may collect one or more observations that may include position information (e.g., 6 DoF parameters) and an RF measurement (e.g., beam measurement data), which the UE may perform using an RF component of the UE (e.g., one or more components described with regard to FIG. 2). As shown by reference number 615, the UE may update the RF map at the UE using the update to the RF map. For example, the UE may add a new anchor to the RF map. As another example, the UE may modify an existing anchor of the RF map. As another example, the UE may delete an existing anchor from the RF map. In example 600, the updated RF map may be in a coordinate system of the UE (e.g., a same coordinate system as RF $Map_{UE}$, or a coordinate system determined relative to the coordinate system of RF $Map_{UE}$ or another reference point).

As indicated above, FIG. 6 is provided as an example. Other examples may differ from what is described with regard to FIG. 6.

Figure 7:
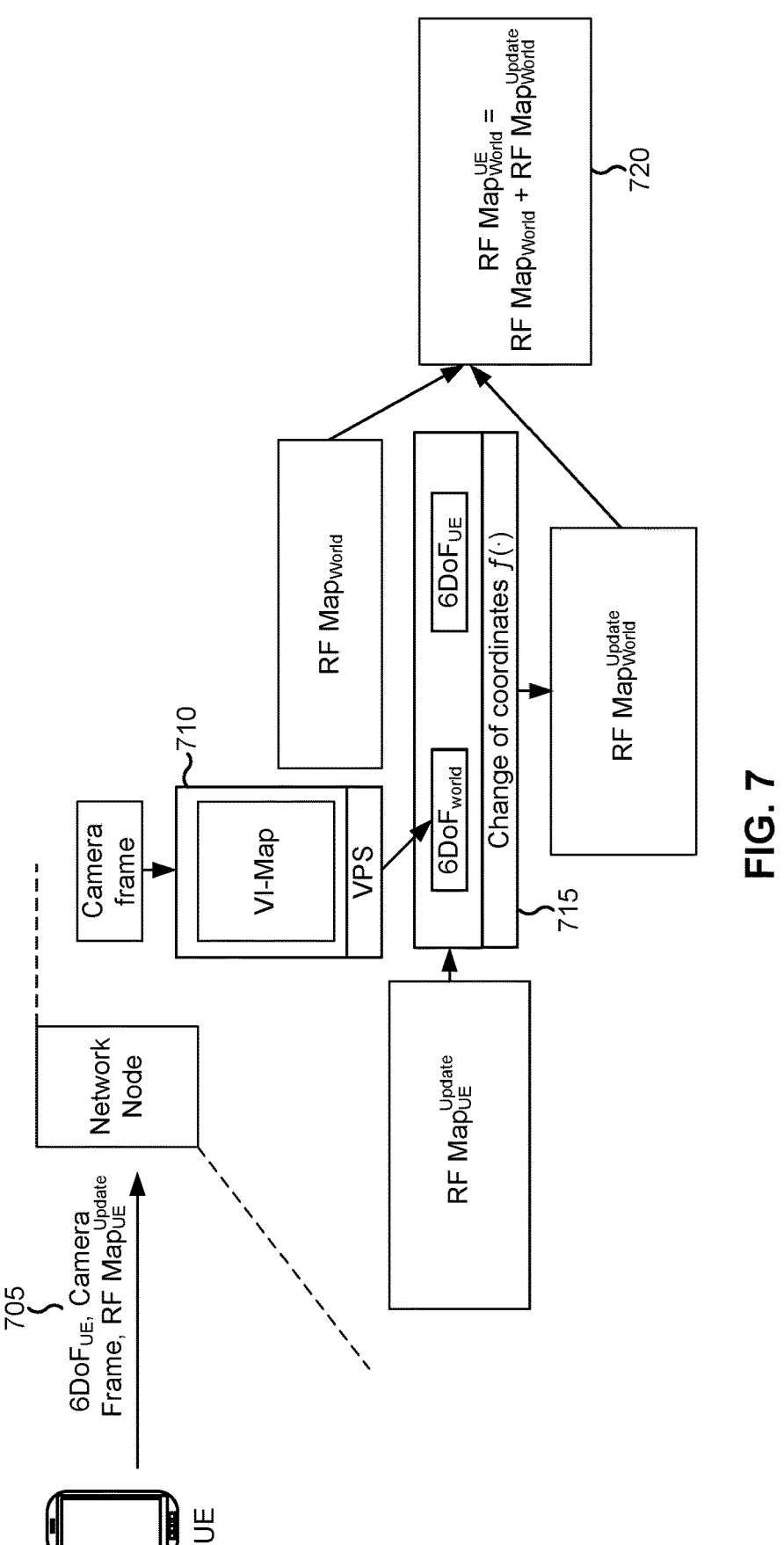
FIG. 7 is a diagram illustrating an example of updating a baseline RF map according to updates to RF maps received from one or more UEs, in accordance with the present disclosure.

FIG. 7 is a diagram illustrating an example 700 of updating a baseline RF map according to updates to RF maps received from one or more UEs, in accordance with the present disclosure. Operations of example 700 may be performed by a UE (e.g., UE 120, the UE of FIGS. 4-6) or a network node (e.g., network node 110, the network node of FIGS. 4-6). FIG. 7 shows examples of providing an update to an RF map (as shown by reference number 445 of FIG. 4) and updating the baseline RF map (as shown by reference number 450 of FIG. 4).

As shown in FIG. 7, and by reference number 705, the UE may transmit, and the network node may receive, an update to the RF map $$\left( RF\ Map_{UE}^{Update} \right).$$

As shown, the update may include an update to the RF map, position information (6DoF$_{UE}$), and camera information ("camera frame"). For example, the UE may send the local RF map (or a portion of its local RF map, or an indication of an update to the RF map) to the cloud along with the position and pose of the UE and a corresponding camera frame.

As shown by reference number 710, the network node (e.g., cloud, a VPS of the network node) may compare the camera information (e.g., the camera frame) with a visual map (VI-map). The VI-map may include a database of camera information (e.g., camera frames) that capture an environment (e.g., building) indicated by the location information. By comparing the camera information with the VI-map, the network node may determine a position and/or pose (e.g., position information such as a 6 DoF parameter) of the UE in a coordinate system of the baseline RF map (referred to as 6DoF$_{World}$), such that the network node can update the correct portion of the baseline RF map. In some aspects, the network node (e.g., VPS) may determine a relevant portion of the baseline RF map based at least in part on the camera information. For example, the cloud may determine which part of the baseline (e.g., global) RF map, such as which building, the UE is located at.

As shown by reference number 715, the network node (e.g., cloud, a change-of-coordinates module of the network node) may identify a transformation f(·) that aligns 6DoF$_{UE}$ and 6DoF$_{World}$, as described above. The network node may apply a transformation f$^{-1}$(·) to the coordinate system of the baseline RF map (e.g., the network node may apply a change of coordinates to the local RF map stored at the network node using f$^{-1}$(·)). Here, the transformation is denoted as an inverse because the transformation transforms the UE's local RF map coordinate system to match with the coordinate system of the baseline RF map. As shown by reference number 720, the network node may merge one or more local RF maps collected from one or more UEs with the baseline RF map.

In some aspects, the network node may update the baseline RF map according to updates received from multiple UEs. For example, the network node may perform the operations illustrated by reference numbers 710, 715, and 720 using position information, camera information, and updates to RF maps received from each of multiple UEs. Thus, the network node can handle different coordinate systems among the multiple UEs.

As indicated above, FIG. 7 is provided as an example. Other examples may differ from what is described with regard to FIG. 7.

FIG. 8 is a diagram illustrating an example process 800 performed, for example, at a UE or an apparatus of a UE, in accordance with the present disclosure. Example process 800 is an example where the apparatus or the UE (e.g., UE 120) performs operations associated with radio frequency map aggregation.

As shown in FIG. 8, in some aspects, process 800 may include transmitting position information regarding a position of the UE and camera information captured by the UE (block 810). For example, the UE (e.g., using transmission component 1004 and/or communication manager 1006, depicted in FIG. 10) may transmit position information regarding a position of the UE and camera information captured by the UE, as described above, for example, in connection with reference number 420 of FIG. 4, 505 of FIG. 5, and 705 of FIG. 7.

As further shown in FIG. 8, in some aspects, process 800 may include receiving a RF map, wherein the RF map is associated with the position information (block 820). For example, the UE (e.g., using reception component 1002 and/or communication manager 1006, depicted in FIG. 10) may receive a RF map, wherein the RF map is associated with the position information, as described above, for example, in connection with reference number 430 of FIG. 4 and reference number 520 of FIG. 5.

As further shown in FIG. 8, in some aspects, process 800 may include transmitting information indicating an update to the RF map (block 830). For example, the UE (e.g., using transmission component 1004 and/or communication manager 1006, depicted in FIG. 10) may transmit information indicating an update to the RF map, as described above, for example, in connection with reference number 445 of FIG. 4 and reference number 705 of FIG. 7.

Process 800 may include additional aspects, such as any single aspect or any combination of aspects described below and/or in connection with one or more other processes described elsewhere herein.

In a first aspect, the RF map uses a coordinate system of the position information.

In a second aspect, alone or in combination with the first aspect, process 800 includes transmitting capability information indicating a capability relating to at least one of a sensor associated with the position information, a calibration parameter associated with the position information or the camera information, or an RF parameter relating to the RF map, as described, for example, in connection with reference number 405 of FIG. 4.

In a third aspect, alone or in combination with one or more of the first and second aspects, process 800 includes receiving signaling that enables at least one of reception of the RF map, transmission of the position information or the camera information, or transmission of the information indicating the update to the RF map, as described, for example, in connection with reference number 410 of FIG. 4.

In a fourth aspect, alone or in combination with one or more of the first through third aspects, further comprising transmitting uplink control information indicating a use case associated with the RF map.

In a fifth aspect, alone or in combination with one or more of the first through fourth aspects, the use case includes at least one of beaming management, handover, or roaming.

In a sixth aspect, alone or in combination with one or more of the first through fifth aspects, process 800 includes receiving signaling indicating whether to transmit the update to the RF map, wherein transmitting the update to the RF map is in accordance with the signaling, as described, for example, with regard to reference number 410 of FIG. 4.

In a seventh aspect, alone or in combination with one or more of the first through sixth aspects, process 800 includes performing an RF operation based at least in part on RF map, as described with regard to FIGS. 4 and 7.

In a eighth aspect, alone or in combination with one or more of the first through seventh aspects, the RF operation includes at least one of a beam update or a mobility operation.

In a ninth aspect, alone or in combination with one or more of the first through eighth aspects, process 800 includes identifying the update to the RF map based at least in part on at least one of a position sensor of the UE or an RF component of the UE, as described, for example, in connection with FIG. 6 generally.

In a tenth aspect, alone or in combination with one or more of the first through ninth aspects, the position of the UE indicates at least one of a spatial location of the UE, or an orientation of the UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, at a network node or an apparatus of a network node, in accordance with the present disclosure. Example process 900 is an example where the apparatus or the network node (e.g., network node 110) performs operations associated with radio frequency map aggregation.

As shown in FIG. 9, in some aspects, process 900 may include receiving position information regarding a position of a UE and camera information captured by the UE (block 910). For example, the network node (e.g., using reception component 1102 and/or communication manager 1106, depicted in FIG. 11) may receive position information regarding a position of UE and camera information captured by the UE, as described above, for example, in connection with reference number 420 of FIG. 4, 505 of FIG. 5, and 705 of FIG. 7.

As further shown in FIG. 9, in some aspects, process 900 may include transmitting an RF map, wherein the RF map is associated with the position information (block 920). For example, the network node (e.g., using transmission component 1104 and/or communication manager 1106, depicted in FIG. 11) may transmit a RF map, wherein the RF map is associated with the position information, as described above, for example, in connection with reference number 430 of FIG. 4 and reference number 520 of FIG. 5.

Process 900 may include additional aspects, such as any single aspect or any combination of aspects described below and/or in connection with one or more other processes described elsewhere herein.

In a first aspect, process 900 includes receiving information indicating an update to the RF map.

In a second aspect, alone or in combination with the first aspect, process 900 includes updating the RF map in accordance with the information indicating the update to the RF map, and transmitting the updated RF map to a second UE, as described, for example, with regard to FIG. 7 generally.

In a third aspect, alone or in combination with one or more of the first and second aspects, the RF map, as transmitted, uses a coordinate system of the position information.

In a fourth aspect, alone or in combination with one or more of the first through third aspects, process 900 includes applying a transformation to a coordinate system of a baseline RF map to generate the RF map as transmitted to the UE, as described, for example, with regard to reference number 515 of FIG. 5 and reference number 425 of FIG. 4.

In a fifth aspect, alone or in combination with one or more of the first through fourth aspects, the transformation is based at least in part on at least one of the position information or the camera information.

In a sixth aspect, alone or in combination with one or more of the first through fifth aspects, process 900 includes receiving capability information indicating a capability relating to at least one of a sensor associated with the position information, a calibration parameter associated with the position information or the camera information, or an RF parameter relating to the RF map, as described above, for example, with regard to reference number 405 of FIG. 4.

In a seventh aspect, alone or in combination with one or more of the first through sixth aspects, process 900 includes transmitting signaling that enables at least one of reception of the RF map, transmission of the position information or the camera information, or transmission of information indicating an update to the RF map, as described above, for example, with regard to reference number 410 of FIG. 4.

In an eighth aspect, alone or in combination with one or more of the first through seventh aspects, process 900 further comprises receiving uplink control information indicating a use case for the RF map, as described, for example, with regard to reference number 415 of FIG. 4.

In a ninth aspect, alone or in combination with one or more of the first through eighth aspects, the use case includes at least one of beaming management, handover, or roaming.

In a tenth aspect, alone or in combination with one or more of the first through ninth aspects, process 900 includes transmitting signaling indicating whether to transmit an update to the RF map, and receiving an update to the RF map in accordance with the signaling, as described, for example, with regard to reference numbers 440 and 445 of FIG. 4.

In an eleventh aspect, alone or in combination with one or more of the first through tenth aspects, the position of the UE indicates at least one of a spatial location of the UE, or an orientation of the UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
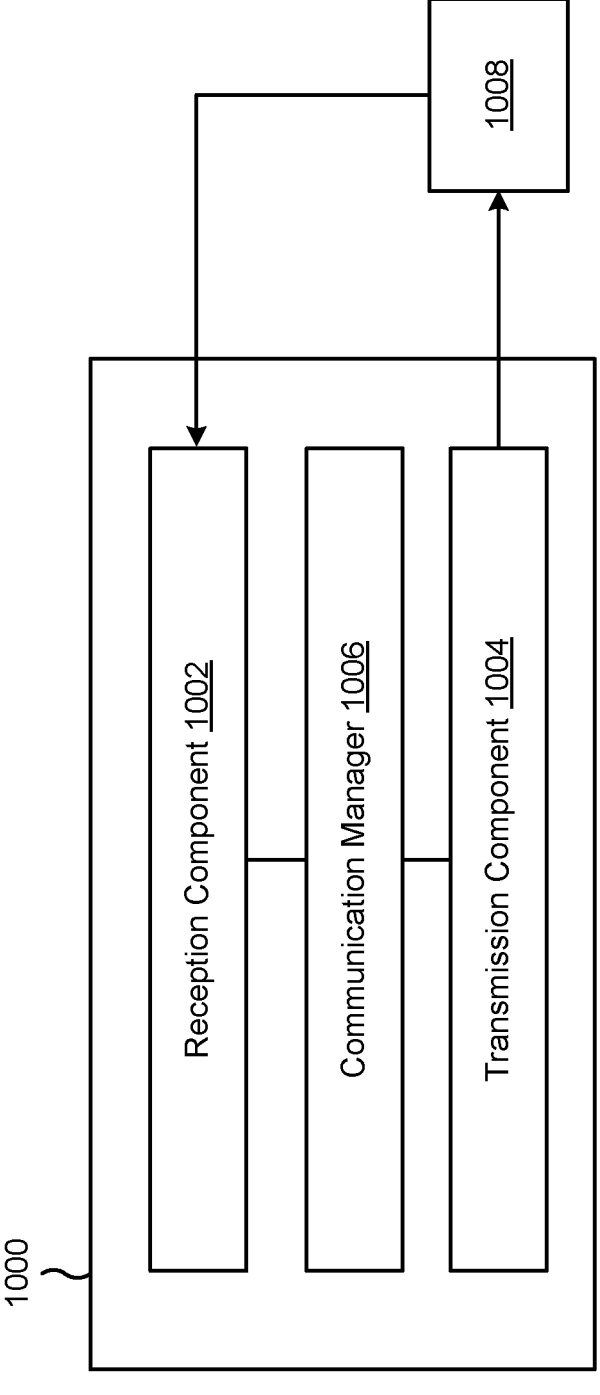
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 140 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 4-7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 1004 may be co-located with the reception component 1002 in one or more transceivers.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The transmission component 1004 may transmit position information regarding a position of the UE and camera information captured by the UE. The reception component 1002 may receive a RF map, wherein the RF map is associated with the position information. The transmission component 1004 may transmit information indicating an update to the RF map.

The transmission component 1004 may transmit capability information indicating a capability relating to at least one of a sensor associated with the position information, a calibration parameter associated with the position information or the camera information, or an RF parameter relating to the RF map.

The reception component 1002 may receive signaling that enables at least one of reception of the RF map, transmission of the position information or the camera information, or transmission of the information indicating the update to the RF map.

The transmission component 1004 may transmit uplink control information indicating a use case associated with the RF map.

The reception component 1002 may receive signaling indicating whether to transmit the update to the RF map, wherein transmitting the update to the RF map is in accordance with the signaling.

The communication manager 1006 may perform an RF operation based at least in part on RF map.

The communication manager 1006 may identify the update to the RF map based at least in part on at least one of a position sensor of the UE or an RF component of the UE.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
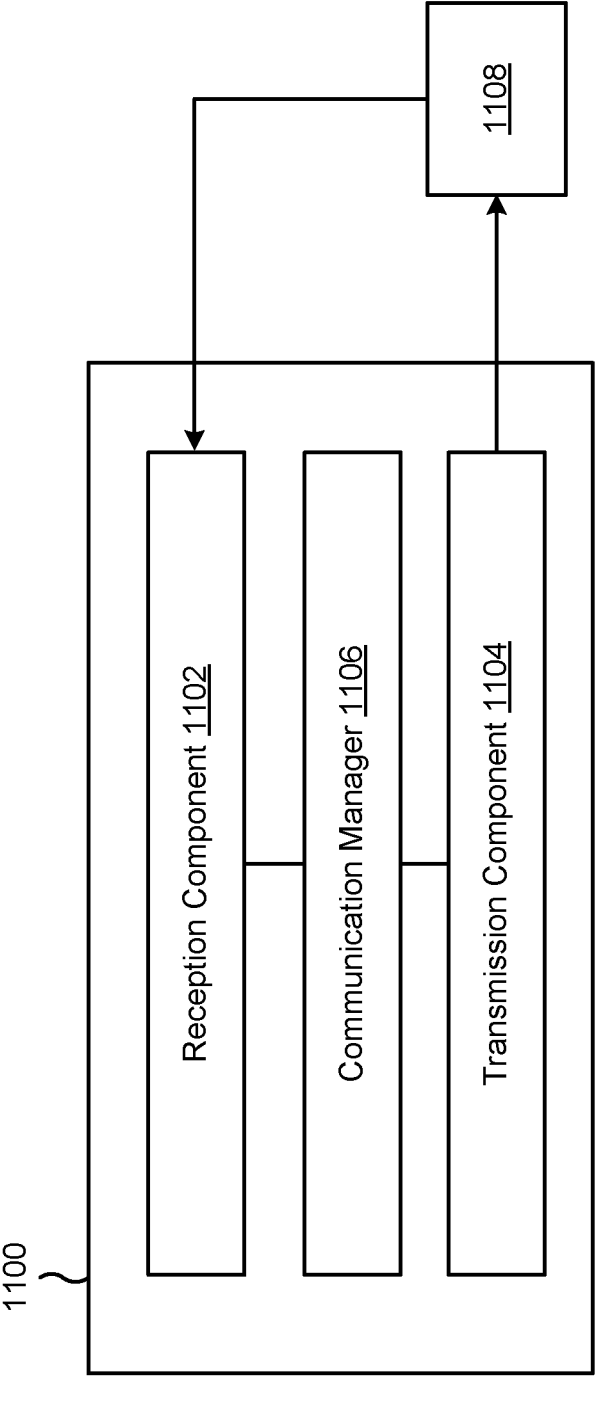
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 150 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 4-7. Additionally, or alternatively, the apparatus 1100 may be configured to perform one or more processes described herein, such as process 9 of FIG. 9, or a combination thereof. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, one or more modems, one or more demodulators, one or more MIMO detectors, one or more receive processors, one or more controllers/processors, one or more memories, or a combination thereof, of the network node described in connection with FIG. 2. In some aspects, the reception component 1102 and/or the transmission component 1104 may include or may be included in a network interface. The network interface may be configured to obtain and/or output signals for the apparatus 1100 via one or more communications links, such as a backhaul link, a midhaul link, and/or a fronthaul link.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, one or more modems, one or more modulators, one or more transmit MIMO processors, one or more transmit processors, one or more controllers/processors, one or more memories, or a combination thereof, of the network node described in connection with FIG. 2. In some aspects, the transmission component 1104 may be co-located with the reception component 1102 in one or more transceivers.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The reception component 1102 may receive position information regarding a position of a UE and camera information captured by the UE. The transmission component 1104 may transmit an RF map, wherein the RF map is associated with the position information.

The reception component 1102 may receive information indicating an update to the RF map.

The communication manager 1106 may update the RF map in accordance with the information indicating the update to the RF map transmitting the updated RF map to a second UE.

The communication manager 1106 may apply a transformation to a coordinate system of a baseline RF map to generate the RF map as transmitted to the UE.

The reception component 1102 may receive capability information indicating a capability relating to at least one of a sensor associated with the position information, a calibration parameter associated with the position information or the camera information, or an RF parameter relating to the RF map.

The transmission component 1104 may transmit signaling that enables at least one of reception of the RF map, transmission of the position information or the camera information, or transmission of information indicating an update to the RF map.

The transmission component 1104 may transmit signaling indicating whether to transmit an update to the RF map receiving an update to the RF map in accordance with the signaling.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: transmitting position information regarding a position of the UE and camera information captured by the UE; receiving a radio frequency (RF) map, wherein the RF map is associated with the position information; and transmitting information indicating an update to the RF map.

Aspect 2: The method of Aspect 1, wherein the RF map uses a coordinate system of the position information.

Aspect 3: The method of any of Aspects 1-2, further comprising transmitting capability information indicating a capability relating to at least one of: a sensor associated with the position information, a calibration parameter associated with the position information or the camera information, or an RF parameter relating to the RF map.

Aspect 4: The method of any of Aspects 1-3, further comprising receiving signaling that enables at least one of reception of the RF map, transmission of the position information or the camera information, or transmission of the information indicating the update to the RF map.

Aspect 5: The method of any of Aspects 1-4, further comprising transmitting uplink control information indicating a use case associated with the RF map.

Aspect 6: The method of Aspect 5, wherein the use case includes at least one of: beam management, handover, or roaming.

Aspect 7: The method of any of Aspects 1-6, further comprising receiving signaling indicating whether to transmit the update to the RF map, wherein transmitting the update to the RF map is in accordance with the signaling.

Aspect 8: The method of any of Aspects 1-7, further comprising performing an RF operation based at least in part on RF map.

Aspect 9: The method of Aspect 8, wherein the RF operation includes at least one of a beam update or a mobility operation.

Aspect 10: The method of any of Aspects 1-9, further comprising identifying the update to the RF map based at least in part on at least one of a position sensor of the UE or an RF component of the UE.

Aspect 11: The method of any of Aspects 1-10, wherein the position of the UE indicates at least one of: a spatial location of the UE, or an orientation of the UE.

Aspect 12: A method of wireless communication performed by a network node, comprising: receiving position information regarding a position of a user equipment (UE) and camera information captured by the UE; and transmitting a radio frequency (RF) map, wherein the RF map is associated with the position information.

Aspect 13: The method of Aspect 12, further comprising receiving information indicating an update to the RF map.

Aspect 14: The method of Aspect 13, further comprising updating the RF map in accordance with the information indicating the update to the RF map; and transmitting the updated RF map to a second UE.

Aspect 15: The method of any of Aspects 12-14, wherein the RF map, as transmitted, uses a coordinate system of the position information.

Aspect 16: The method of Aspect 15, further comprising applying a transformation to a coordinate system of a baseline RF map to generate the RF map as transmitted to the UE.

Aspect 17: The method of Aspect 16, wherein the transformation is based at least in part on at least one of the position information or the camera information.

Aspect 18: The method of any of Aspects 12-17, further comprising receiving capability information indicating a capability relating to at least one of: a sensor associated with the position information, a calibration parameter associated with the position information or the camera information, or an RF parameter relating to the RF map.

Aspect 19: The method of any of Aspects 12-18, further comprising transmitting signaling that enables at least one of reception of the RF map, transmission of the position information or the camera information, or transmission of information indicating an update to the RF map.

Aspect 20: The method of any of Aspects 12-19, wherein receiving the position information and the camera information further comprises receiving uplink control information indicating a use case for the RF map.

Aspect 21: The method of Aspect 20, wherein the use case includes at least one of: beam management, handover, or roaming.

Aspect 22: The method of any of Aspects 12-21, further comprising transmitting signaling indicating whether to transmit an update to the RF map; and receiving an update to the RF map in accordance with the signaling.

Aspect 23: The method of any of Aspects 12-22, wherein the position of the UE indicates at least one of: a spatial location of the UE, or an orientation of the UE.

Aspect 24: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-23.

Aspect 25: An apparatus for wireless communication at a device, the apparatus comprising one or more memories and one or more processors coupled to the one or more memories, the one or more processors configured to cause the device to perform the method of one or more of Aspects 1-23.

Aspect 26: An apparatus for wireless communication, the apparatus comprising at least one means for performing the method of one or more of Aspects 1-23.

Aspect 27: A non-transitory computer-readable medium storing code for wireless communication, the code comprising instructions executable by one or more processors to perform the method of one or more of Aspects 1-23.

Aspect 28: A non-transitory computer-readable medium storing a set of instructions for wireless communication, the set of instructions comprising one or more instructions that, when executed by one or more processors of a device, cause the device to perform the method of one or more of Aspects 1-23.

Aspect 29: A device for wireless communication, the device comprising a processing system that includes one or more processors and one or more memories coupled with the one or more processors, the processing system configured to cause the device to perform the method of one or more of Aspects 1-23.

Aspect 30: An apparatus for wireless communication at a device, the apparatus comprising one or more memories and one or more processors coupled to the one or more memories, the one or more processors individually or collectively configured to cause the device to perform the method of one or more of Aspects 1-23.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
  one or more memories; and
  one or more processors, coupled to the one or more memories, individually or collectively configured to cause the UE to:
    transmit position information regarding a position of the UE and camera information captured by the UE;
    receive a radio frequency (RF) map, wherein the RF map is associated with the position information; and

34 transmit information indicating an update to the RF map.
2. The apparatus of claim 1, wherein the RF map uses a coordinate system of the position information.
3. The apparatus of claim 1, wherein the one or more processors are individually or collectively configured to cause the UE to transmit capability information indicating a capability relating to at least one of:
  a sensor associated with the position information,
  a calibration parameter associated with the position information or the camera information, or
  an RF parameter relating to the RF map.
4. The apparatus of claim 1, wherein the one or more processors are individually or collectively configured to cause the UE to receive signaling that enables at least one of reception of the RF map, transmission of the position information or the camera information, or transmission of the information indicating the update to the RF map.
5. The apparatus of claim 1, wherein the one or more processors are individually or collectively configured to cause the UE to transmit uplink control information indicating a use case associated with the RF map.
6. The apparatus of claim 5, wherein the use case is associated with at least one of:
  beam management,
  handover, or
  roaming.
7. The apparatus of claim 1, wherein the one or more processors are individually or collectively configured to cause the UE to receive signaling indicating whether to transmit the update to the RF map, wherein the update to the RF map is in accordance with the signaling.
8. The apparatus of claim 1, wherein the one or more processors are individually or collectively configured to cause the UE to perform an RF operation based at least in part on the RF map.
9. The apparatus of claim 8, wherein the RF operation includes at least one of a beam update or a mobility operation.
10. The apparatus of claim 1, wherein the one or more processors are individually or collectively configured to cause the UE to identify the update to the RF map based at least in part on at least one of a position sensor of the UE or an RF component of the UE.
11. The apparatus of claim 1, wherein the position of the UE indicates at least one of:
  a spatial location of the UE, or
  an orientation of the UE.
12. An apparatus for wireless communication at a network node, comprising:
  one or more memories; and
  one or more processors, coupled to the one or more memories, individually or collectively configured to cause the network node to:
    receive position information regarding a position of a user equipment (UE) and camera information captured by the UE;
    transmit a radio frequency (RF) map, wherein the RF map is associated with the position information; and
    receive information indicating an update to the RF map.
13. The apparatus of claim 12, wherein the one or more processors are individually or collectively configured to cause the network node to update the RF map in accordance with the information indicating the update to the RF map; and
    transmit the updated RF map to a second UE.

14. The apparatus of claim 12, wherein the RF map, as transmitted, uses a coordinate system of the position information.

15. The apparatus of claim 14, wherein the one or more processors are individually or collectively configured to cause the network node to apply a transformation to a coordinate system of a baseline RF map to generate the RF map as transmitted to the UE.

16. The apparatus of claim 15, wherein the transformation is based at least in part on at least one of the position information or the camera information.

17. The apparatus of claim 12, wherein the one or more processors are individually or collectively configured to cause the network node to transmit signaling that enables at least one of reception of the RF map, transmission of the position information or the camera information, or transmission of information indicating an update to the RF map.

18. The apparatus of claim 12, wherein the one or more processors are configured to cause the network node to receive uplink control information indicating a use case for the RF map.

19. The apparatus of claim 12, wherein the one or more processors are individually or collectively configured to cause the network node to transmit signaling indicating whether to transmit an update to the RF map; and
receive an update to the RF map in accordance with the signaling.

20. The apparatus of claim 12, wherein the position of the UE indicates at least one of:
a spatial location of the UE, or
an orientation of the UE.

21. A method of wireless communication performed by a user equipment (UE), comprising:
transmitting position information regarding a position of the UE and camera information captured by the UE;

36 receiving a radio frequency (RF) map, wherein the RF map is associated with the position information; and
transmitting information indicating an update to the RF map.

22. The method of claim 21, wherein the RF map uses a coordinate system of the position information.

23. The method of claim 21, further comprising receiving signaling that enables at least one of reception of the RF map, transmission of the position information or the camera information, or transmission of the information indicating the update to the RF map.

24. The method of claim 21, further comprising receiving signaling indicating whether to transmit the update to the RF map, wherein transmitting the update to the RF map is in accordance with the signaling.

25. The method of claim 21, wherein the position of the UE indicates at least one of:
a spatial location of the UE, or
an orientation of the UE.

26. A method of wireless communication performed by a network node, comprising:
receiving position information regarding a position of a user equipment (UE) and camera information captured by the UE;
transmitting a radio frequency (RF) map, wherein the RF map is associated with the position information; and
receiving information indicating an update to the RF map.

27. The method of claim 26, wherein the RF map, as transmitted, uses a coordinate system of the position information.

28. The method of claim 26, wherein receiving the position information and the camera information further comprises receiving uplink control information indicating a use case for the RF map.

* * * * *